Patented Mar. 18, 1924.

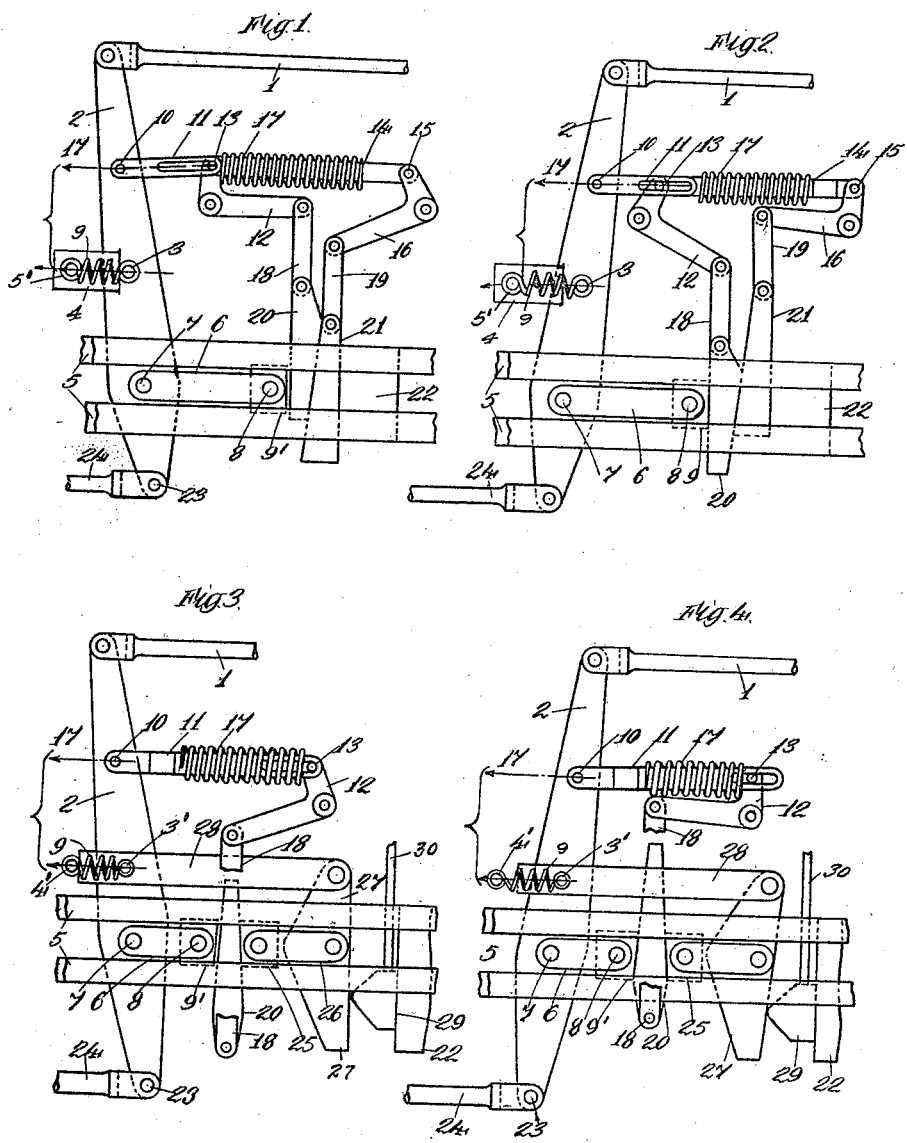

1,486,926

UNITED STATES PATENT OFFICE.

ALFRED SCHEUER, OF VIENNA, AND HUGO SCHEUER, OF RETZ, AUSTRIA, ASSIGNORS TO HANDEL MAATSCHAPPIJ H. ALBERT DE BARY & COY, OF AMSTERDAM, NETHERLANDS, A DUTCH COMPANY.

BRAKE APPARATUS.

Application filed August 26, 1921. Serial No. 495,505.

(GRANTED UNDER THE PROVISIONS OF THE ACT OF MARCH 3, 1921, 41 STAT. L., 1313.)

*To all whom it may concern:*

Be it known that we, ALFRED SCHEUER and HUGO SCHEUER, both Austrian citizens, residing, respectively, at 12 Nordbahnstrasse, Vienna, Austria, and 107 Vinvenciplatz, Retz, Austria, have invented certain new and useful Brake Apparatus (for which I have filed applications in England May 3, 1921, Patent No. 165,077, and in Austria June 16, 1920), of which the following is a specification.

This invention has reference to braking apparatus for vehicles particularly the compressed air or vacuum brakes of railway or similar vehicles.

The present invention embodies constructional forms of braking apparatus with only one brake lever, which enable the same to be used not only for vehicles with a fixed, but also for vehicles with a variable working transmission. With these constructions the consumption of energy, for the engagement of the organ effecting the alteration of the transmission is always uniformly small independently of the load upon the vehicle. According to the present invention a wedge or wedges may be used between an abutment and the brake lever, such wedge or wedges being found to remain fast even with a considerable angle of friction owing to the approximately uniform magnitude of the friction of the wedge surface or surfaces.

In order that the invention may be clearly understood and readily carried into effect we will now proceed to describe the same more fully with reference to the accompanying drawings in which:—

Figures 1 and 2 are plan views illustrating by way of example one constructional form applicable to vehicles with uniform working transmissions in Figure 1 the parts being represented in the position they assume when the brake is on and in Figure 2 the parts being represented in their "off" position.

Figures 3 and 4 represent by way of example a second constructional form applicable to vehicles with variable working transmission Figure 3 being a plan view with the parts in their "on" position and Figure 4 a similar view with the parts in their "off" position.

Figure 5:
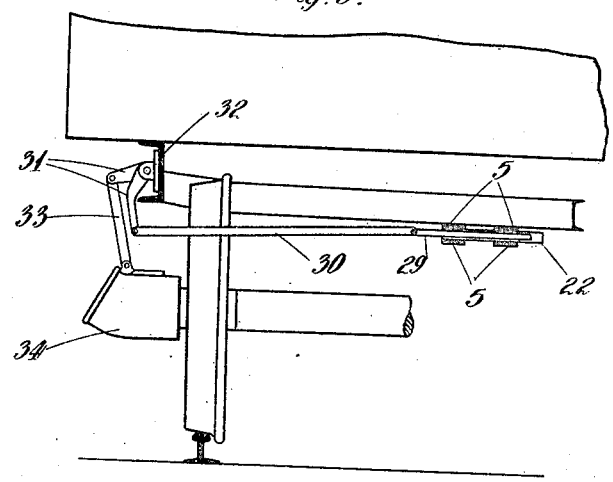
Figures 5 and 6 illustrate a part of a vehicle with a portion of the braking apparatus shown in connection therewith in two different positions.

Referring first to Figures 1 and 2, the brake rod —1— actuated by the brake plunger is attached to the brake lever —2— the bolt —3— of which is not rigidly journalled but is pressed against a fixed stop —4— by the springs —9— and —17— acting on the brake lever. The spring 9 is preferably connected at one end to the bolt 3 of the brake lever, and at its opposite end to a suitable bolt 5' extending from the substantially rectangular stop 4. The brake lever —2— is guided between the four guide rails —5—, and is secured against lateral displacement by the fish-plates —6— movable between the guide rails and connected to the brake lever —2— by the bolt —7—. At the free end of the fish-plates —6— a sliding piece —9¹— is held by means of a bolt —8—. From the bolts —10— of the brake lever —2— there leads a slotted link —11— to a bell crank lever —12— the bolt —13— of which, located in the short lever arm, is adapted to slide in a slot in the link —11—. From this bolt —13— there leads to the bolt —15— of a second bell crank lever —16— a connecting link —14— upon which there is mounted a helical spring —17— having a certain initial tension and abutting against the end of the slotted link. Adjustable coacting wedges —20— and —21— are connected to the long arms of the bell crank levers —12— and —16— by means of intermediate arms —18— and —19—. The wedge —21— has a fixed abutment upon a plate —22— or the like. The delivery of brake power from the brake lever to the brake blocks is effected by means of the bolt —23— and of the brake rod —24—.

The method of operation of this rod is as follows:

With the parts in the position shown in Figure 1, if the brake rod —1— be drawn to the right then the end of the lever —2— also connected with it will be moved to the right. Now as the resistance arising to the movement of the brake rod —24— is overcome by the springs —9— and —17— acting upon the brake lever —2—, the bolt —3— will for the time being not be moved from the stop —4—, but lever —2— will turn round this bolt and at the same time, owing to the guiding of the bolt —7— will experience a slight lateral displacement between the guide rails —5—. Hence the bolt, —7—, and, owing to the fish-plates —6—, also the sliding piece —9¹— will be moved to the left. Of course at the same time the link —11— moves to the right, and presses with its end upon the spring —17— whereby the two bell crank levers —12— and —16— are turned and the wedges —20— and —21— are pushed towards each other. As the wedge —21— finds a firm abutment or support upon the plate —22—, the wedge —20— is pushed somewhat to the left whilst, by corresponding dimensioning and arrangement a certain small room for play is always maintained between the wedge —20— and the sliding piece —9¹— during the entire idling of the rod. Now if the brake blocks are applied firmly to the wheels so that the brake pressure rod —24— cannot move any further, then under the continued action of the movement of the brake plunger, the brake lever —2— will swing out to the right round the bolt —23—. At the same time the bolt —7— and with it the sliding piece —9¹— will move to the right, whilst simultaneously the left-side back of the wedge —20— advances more rapidly to the left during the now more rapid movement of the bolt —10— to the right, so that the small crevice between the parts —9¹— and —20,— disappears. Then the bolt —7— can for the further progress of the braking find a firm hold on the plate —22— by means of the fishplates —6— of the sliding piece —9¹— and of the wedges —20— and —21—. If this has been attained then, upon continuation of the braking operation, the brake lever —2— turns round the stationary bolt —7—; hence for the working period of the braking operation that transmission is decisive which is determined by the position of the bolt —7—. The link —11— during this period can, owing to the existence of the slot, move further to the right while at the same time compressing the spring —17—.

On releasing the braking pressure the procedure is reversed. All the individual parts again return to their initial position.

Figure 6:
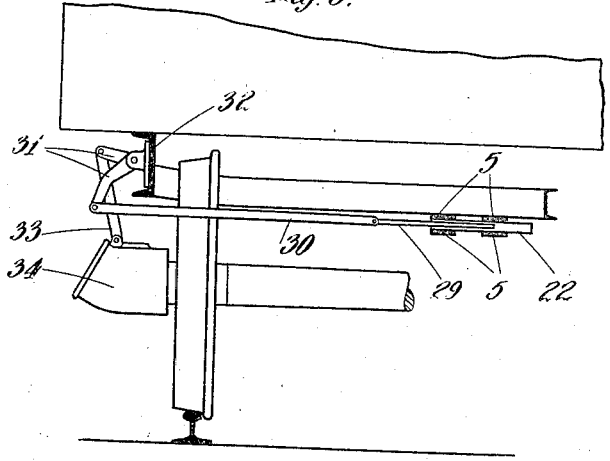

Referring now to Figures 3 and 4 illustrating a second constructional form of the brake rod by way of example, for vehicles with variable working transmission in this construction the distance between the bolts —3— and —7— is open to free selection and is preferably selected smaller than that already given in the constructional form described. In this way the path traversed by the bolt —7—, during the idling of the rod, will be smaller, so that it is possible to make the device also for greater brake block distances with only one wedge —20— of about the same inclination. This wedge, however, does not support itself to the right upon a fixed bearing surface but upon a second sliding piece —25— which is connected by means of the fish-plates —26— with the cross beam —27— one end of which is in communication through the fishplates —28— with the bolt —3— of the brake lever —2—. In this form of the invention, the spring 9 is connected at the outer end to a fixed pin 4' which also acts as an abutment for the link 28, while the inner end of the spring is secured to the bolt 3' on the brake lever 2. Between the beam —27— and the fixed abutment—22— is disposed a bearing piece —29— which is adapted to be displaced when the brake is released. This bearing piece 29 can be adjusted, by hand or by an automatic device, to correspond to the gross weight of the vehicle. As shown in Figures 5 and 6, the automatic operation of the bearing piece —29— by the weight of the vehicle is effected by connecting the bearing piece —29— by a link 30 to one arm of a double arm lever 31 mounted on the frame 32 of the vehicle, the other arm of the lever 31 being connected by a link 33 to an axle box 34 on one of the axles of the vehicle. The varying loads of the vehicle vary the distance between the frame 32 of the vehicle and the axle box 34, and thereby operates the lever 31 and moves the bearing piece 29 through the link 30. The method of operation of this device is as follows:

During the idling of the brake rod, which owing to the springs —9— and —17— acting upon the lever —2—, is effected while this lever rotates around the bolt —3—, the fishplates —28— and the beam —27— remain at rest. During this movement of the lever 2 the wedge —20— will be displaced but the arrangement is such that the slight distance between the left wedge back and the sliding piece —9¹— is maintained during the idling of the rod. If the brake blocks are already firmly applied to the wheels then, as in the constructional form already described with reference to Figures 1 and 2 this crevice will rapidly disappear and the bolt —7— again comes to a stop on the part 29 through the fishplates —6—, sliding piece —9¹—, wedge —20— sliding piece —25—, fishplates —26— and the corresponding bolts. The connection of the brake lever —2— and of the beam —27— on the one hand by means of the part —20— and, on the other hand, by means of the fishplate —28— can be approximately regarded as a parallel guide, so that the parts —2— and —27— always experience approximately the same displacement. The brake lever —2— turns, therefore, during the actual braking operation round an ideal fulcrum or point of rotation, which is determined by the actual position of the bearing or supporting piece —29—; the transmission of work or duty of the rod adapts itself, therefor, to the actual position of the supporting piece —27— and, consequently, also to the actual load of the vehicle, whilst the idling transmission is, as with the first constructional form, independent of the load determined only through the position of the bolt —3¹—. Also in this case upon releasing the brake all the parts again return to their initial position, whereupon the supporting piece —29— again becomes easily movable. The fixed support —4'— is here shown in the form of a bolt, against which the fishplates —28— bear.

The present arrangement can, of course, be used not only for vehicles with a variable, but also for vehicles with a fixed working transmission of the brake lever —2— for instance in such cases where the latter comes into question for passenger cars.

The most varied deviations are possible in the construction herein set forth and the arrangement can be used not only for brakes but also far workshop machinery and all those technical devices in connection with which it is requisite to alter an existing transmission automatically at a given movement.

What we claim and desire to secure by Letters Patent of the United States is:—

1. Braking apparatus comprising a brake lever, a fixed abutment, and an adjustable means disposed between the brake lever and the abutment, the said adjustable means being connected with and controlled by the brake lever and supported against transverse movement by the said abutment in a number of different positions.

2. Braking apparatus comprising a brake lever, a fixed abutment, and an adjustable means embodying a wedge shaped member disposed between the brake lever and the abutment, the said adjustable means being connected with and controlled by the brake lever and supported against transverse movement by the said abutment in a number of different positions.

3. Braking apparatus comprising a brake lever, a fixed abutment, and an adjustable means embodying a pair of co-acting wedge shaped members connected with and controlled by the brake lever and disposed between the brake lever and the said abutment.

4. Braking apparatus comprising a brake lever, a fixed abutment, an adjustable means disposed between the brake lever and the abutment, the said adjustable means being connected with and controlled by the brake lever, and a spring interposed between the brake lever and the said adjustable means and directly co-acting with the brake lever in the operation of the said means.

5. Braking apparatus comprising a brake lever, a fixed abutment, an adjustable means embodying a wedge shaped member connected with and controlled by the brake lever and disposed betwen the brake lever and the fixed abutment, and a spring interposed between the brake lever and the said adjustable means.

6. Braking apparatus comprising a brake lever, a fixed abutment, an adjustable means embodying a pair of co-acting wedge shaped members connected with and controlled by the brake lever and disposed between the brake lever and the fixed abutment, and a spring interposed between the brake lever and the said adjustable means.

7. Braking apparatus for vehicles, comprising a brake lever, a fixed abutment, an adjustable means connected with and controlled by the brake lever and disposed between the brake lever and the abutment, and a bearing piece disposed between the fixed abutment and the said adjustable means and capable of being adjusted relatively thereto.

8. Braking apparatus for vehicles comprising a brake lever, a fixed abutment, an adjustable means embodying a wedge shaped member connected with and controlled by the brake lever and disposed between the brake lever and the fixed abutment, and a bearing piece disposed between the fixed abutment and the adjustable means and adaped to be adjusted relatively to the latter.

9. Braking apparatus for vehicles comprising a brake lever, a fixed abutment, an adjustable means embodying a pair of co-acting wedge shaped members connected with and controlled by the brake lever and disposed between the brake lever and the fixed abutment, and a bearing piece disposed between the fixed abutment and the adjustable means.

10. Braking apparatus for vehicles comprising a brake lever, a fixed abutment, an adjustable means connected with and controlled by the brake lever and disposed be-between the brake lever and the fixed abutment, a spring interposed between the brake lever and the adjustable means, and a bearing piece capable of being adjusted according to the load on the vehicle and relatively to and between the fixed abutment and the adjustable means.

11. Braking apparatus for vehicles comprising a brake lever, a fixed abutment, an adjustable means embodying a wedge shaped member connected with and controlled by the brake lever and disposed between the brake lever and the abutment, a spring interposed between the brake lever and the adjustable means, and a bearing piece capable of being adjusted according to the load on the vehicle and relatively to and between the fixed abutment and the adjustable means.

12. Braking apparatus for vehicles comprising a brake lever, a fixed abutment, an adjustable means embodying a pair of coacting wedge shaped members connected with and controlled by the brake lever and disposed between the brake lever and the abutment, a spring interposed between the brake lever and the adjustable means, and a bearing piece capable of being adjusted according to the load on the vehicle and disposed between the fixed abutment and the adjustable means.

13. Braking apparatus comprising a spring controlled brake lever, a bell-crank lever connected therewith, a fixed abutment, a sliding piece connected with the brake lever, and a wedge connected with the bell-crank lever and disposed between the fixed abutment and the sliding piece.

14. Braking apparatus comprising a spring controlled brake lever, a slotted link attached thereto, a bell-crank lever connected with the slotted link, a spring mounted on the slotted link, a fixed abutment, a sliding piece, an attachment link between the brake lever and the sliding piece, and a wedge connected with the bell-crank lever and disposed between the fixed abutment and the sliding piece.

15. Braking apparatus comprising a spring controlled brake lever, a bell-crank lever, a slotted link connecting the brake lever and the bell-crank lever, a spring mounted on the link and bearing against one end of the bell-clank lever, a pivotally supported cross-beam, a fixed abutment for the cross beam, a connecting link between the cross-beam and the brake lever, sliding pieces connected with the brake lever and the cross-beam, and a wedge disposed between the sliding piece and connected with the bell-crank lever.

16. Braking apparatus comprising a spring controlled brake lever, a bell-crank lever, a slotted link connecting the brake lever and the bell-crank lever, a spring mounted on the link and bearing against one end of the bell-crank lever, a pivotally supported cross-beam, a fixed abutment, an adjustable bearing piece disposed between the fixed abutment and the cross beam, a connecting link between the cross beam and the brake lever, sliding pieces connected with the brake lever and the cross beam, and a wedge disposed between the sliding pieces and connected with the bell-crank lever.

ING. ALFRED SCHEUER.
HUGO SCHEUER.